Dec. 20, 1938.   E. A. LARSSON   2,140,705
CAR COUPLER
Filed Oct. 7, 1936   3 Sheets-Sheet 1
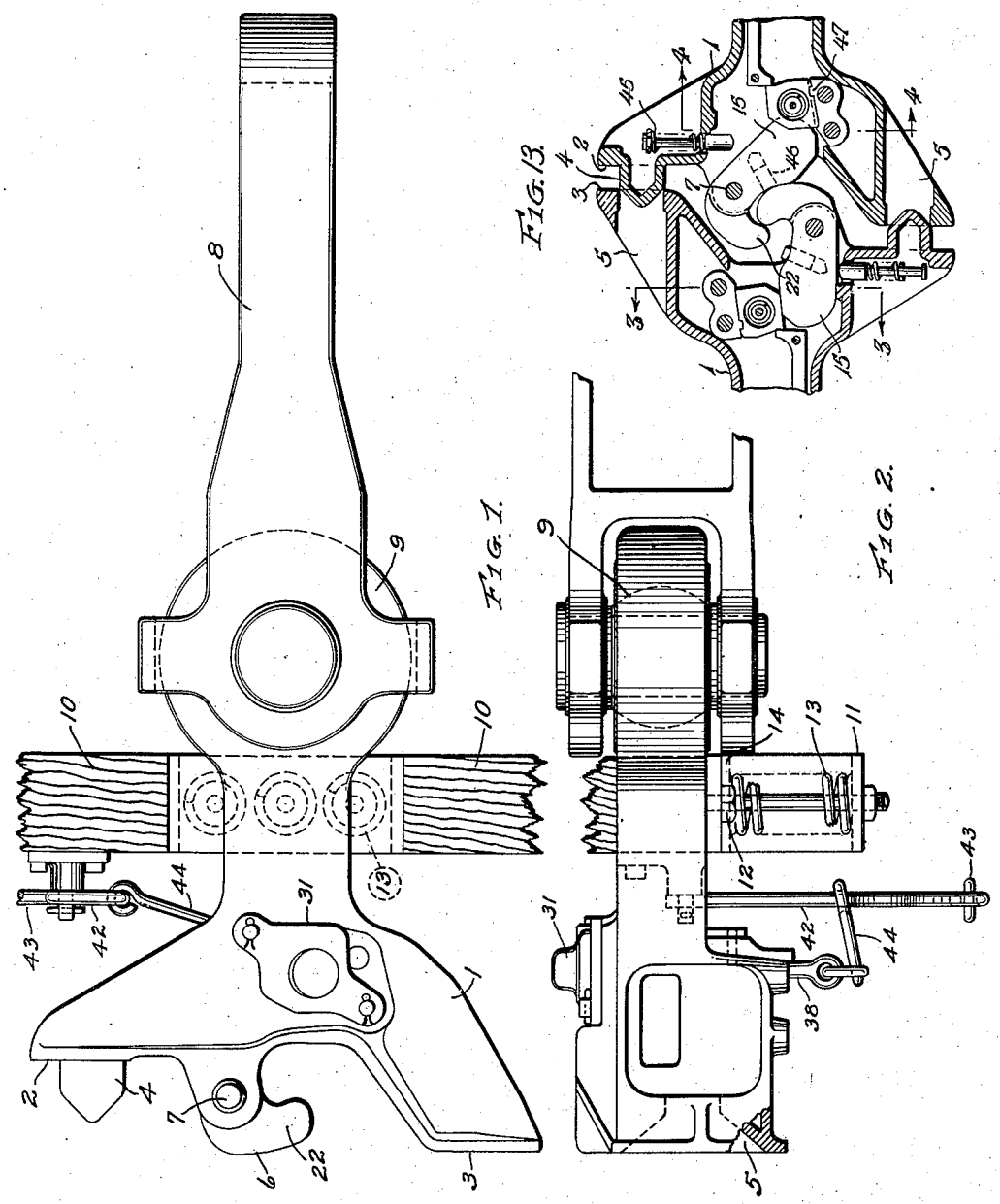
Inventor
ERNST A. LARSSON
By
Attorney Dec. 20, 1938.  E. A. LARSSON  2,140,705
CAR COUPLER
Filed Oct. 7, 1936  3 Sheets-Sheet 2
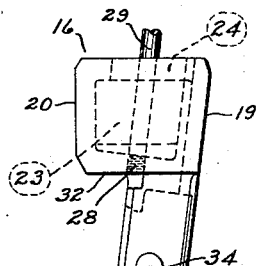
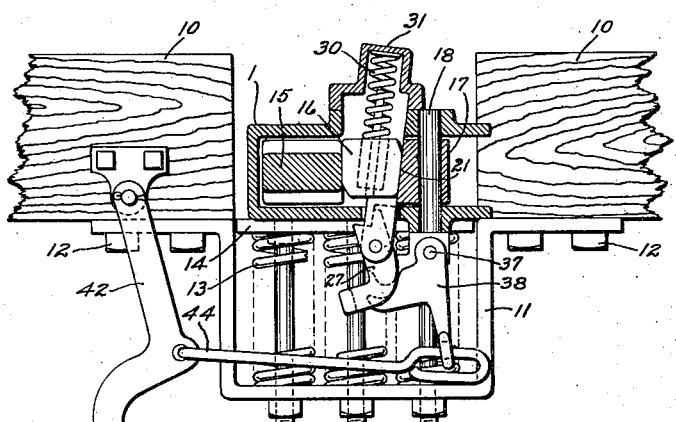
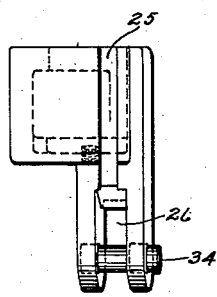
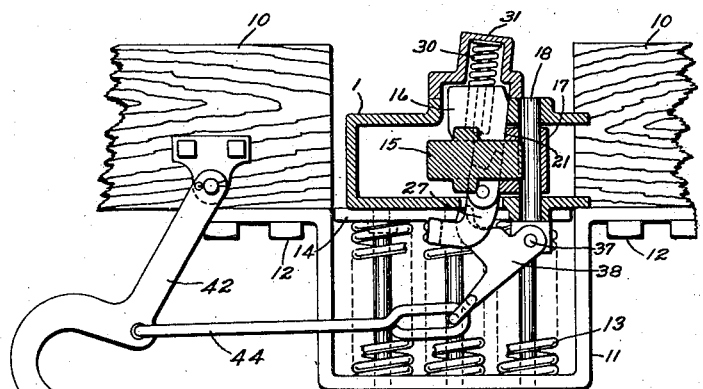
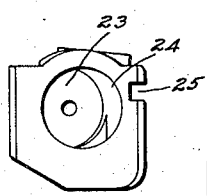
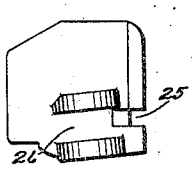
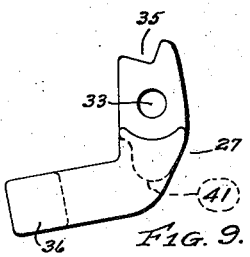
Inventor
ERNST A. LARSSON
By
Attorney Patented Dec. 20, 1938

2,140,705

UNITED STATES PATENT OFFICE 2,140,705

CAR COUPLER

Ernst A. Larsson, Mansfield, Ohio, assignor to The Ohio Brass Company, Mansfield, Ohio, a corporation of New Jersey Application October 7, 1936, Serial No. 104,402

8 Claims. (Cl. 213—142)

My invention relates to couplers for cars and has particular reference to couplers which are capable of being tightly coupled against vertical, lateral, torsional, and longitudinal relative movement and which are of the Janney or Master Car Builders type.

One object of my invention is to provide a coupler of the above type in which the lock is of the vertical operating type.

There are conditions under which a coupler constructed as disclosed by Tomlinson Patent 1,660,733 cannot be used, and for that reason I have found it necessary to provide a coupler of the Janney type which will tight lock and employing a vertical sliding lock.

In the design of such a coupler, I have found it advisable to provide means other than that normally used in closing the knuckle to assist in such closing, as will later be fully described.

My invention is largely the coupler head per se, therefore, my disclosure is confined almost exclusively to the coupler head, its construction and operation.

My invention resides in the new and novel construction, combination and relation of the parts hereinafter described and shown in the accompanying drawings.

In the drawings:

Fig. 1 is a top plan view of my invention shown as spring supported and connected to a tail piece.

Fig. 2 is a side view in elevation of my invention as shown in Fig. 1.

Fig. 3 is a view in partial section of the coupler head taken on the line 3—3 of Fig. 13 and shows the parts in fully coupled position.

Fig. 4 is a view in partial section of the coupler head taken on the line 4—4 of Fig. 13 and shows the parts in uncoupled relation.

Figs. 5, 6, 7, and 8 are side, face, top, and bottom views respectively of the vertical lock.

Fig. 9 is a side view of the safety latch which I employ.

Fig. 10 is a side view of the uncoupling link pivotally secured to the lower part of the coupler head.

Figure 11:
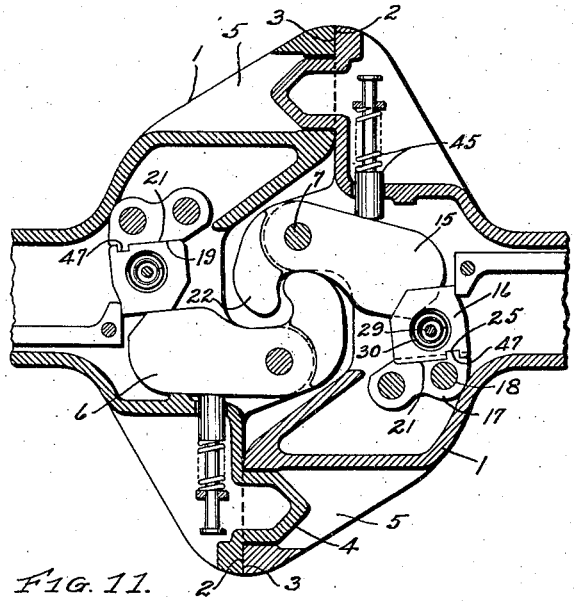

Fig. 11 shows a horizontal view in partial section of two heads which have been brought together but which are not fully locked as the heads are shown without the means earlier referred to for assisting to complete the coupling of two heads.

Figure 12:
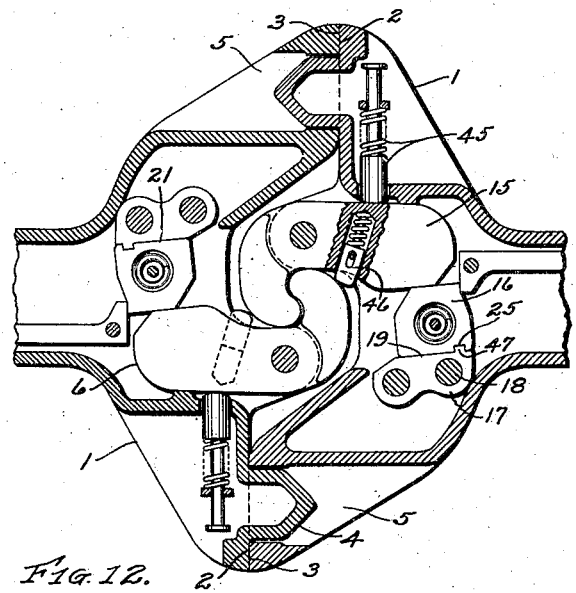

Fig. 12 shows a horizontal view in partial section of two heads fully locked together and also shows the means for completing the locking operation.

Fig. 13 shows a horizontal view in partial section of the bringing together or separating of two heads in which the lock on one head has been raised to the unlocking position.

The preferred embodiment of my invention comprises a coupler head 1 having a face 2 and a face 3. The face 2 is provided with a projecting pin 4 which enters a recess 5 opening onto the face 3 of the coupler and having a belled mouth.

The face 2 is arranged to butt up against the face 3 of a counterpart coupler when two heads are in coupled relation and the pins 4 entering their respective openings in the counterpart head will prevent relative lateral, torsional and vertical movement of the heads and also assist in maintaining the heads in longitudinal alignment.

The head is also provided with a pivotally mounted knuckle 6 secured to the head by means of the knuckle pin 7. The knuckles on two co-operating cars interlock and hold the faces in engagement and prevent relative longitudinal movement of the heads.

The coupler head may be secured to a draft-gear member 8 or to a draft-gear of any approved type which in turn is secured to a car. The coupler head is shown in Figs. 1 and 2 as secured to the draft member 8 by means of a ball and socket connection 9. The head is mounted on the car between the sills 10 and is supported by a spring carrier comprising a U-shaped yoke member 11 secured to the sills by means of the bolts 12 and supporting the springs 13. The springs are capped by means of a plate 14 upon which the coupler head directly rests. This construction yieldingly supports the head and also permits lateral movement of the head upon the plate 14 and about the universal joint 9.

Referring to Fig. 3, I have shown the tail of the knuckle at 15 and the vertical lock 16 is shown in its locking position. The lock is backed up by the back stop 17 held in position by the studs 18.

The details of the vertical sliding lock are better shown in Figs. 5, 6, 7, and 8. Fig. 5 is an enlarged face view of the sliding lock shown in Fig. 3. It will be noted that the face 19 which engages with the back stop 17 is angularly disposed to the face 20 which engages with the knuckle tail 15. The face 21 of the back stop 17, which is engaged by the lock, is also angularly disposed so that when the lock moves downwardly between the knuckle tail 15 and the back stop 17, the knuckle tail will be moved about the pivot 7 and the forward end 22 of the knuckle will be moved to its locking position.

The parts are so designed and arranged that when two coupler heads are in coupled position with their faces 2 and 3 engaging and the knuckles in interlocked relation, the lock 16 is constantly urging the heads to be drawn more tightly together, thus maintaining the heads in rigid alignment with all slack eliminated.

The locking means 16 acting upon the tail of the knuckle 15 when two heads are in coupled position exerts a continuous force tending to draw the faces of the couplers together and having further capacity for additional movement beyond that necessary to bring the faces into contact. This assures the coupler heads being held in tight coupled relation at all times and also compensates for wear.

The lock 16 is provided with a recess 23 with an opening 24, a guide slot 25 and a slot 26 to receive the safety latch 27.

The lock 16 is provided with a threaded opening 28 in which is secured a guide rod 29 which projects through the opening 24 and aids in maintaining the spring 30 in position relative to the lock 16.

The spring 30 maintains the lock in its locking position and prevents it creeping upwardly and at the same time exerts a consant force tending to press the lock into further locking position with the knuckle tail. The upper end of the spring 30 is held in position by means of the removable cap 31.

When the lock is in its raised or unlocking position, as shown in Fig. 4, its face 32 rests upon the upper face of the knuckle tail which is swung to one side, as in Fig. 13.

Pivotally mounted in the slot 26 of the lock is the safety latch 27 which is provided with an opening 33 to receive a pin 34. The latch 27 is also notched at 35 and which notch is arranged to engage with the coupler body when the coupler parts are in full coupled relation (see Fig. 3). This safety latch is an additional means insuring the lock against being moved to its uncoupling position when two heads are coupled. The movement of the latch to its safety position is controlled by means of the weighted end 36 which is acted upon by gravity.

Pivoted to the under side of the coupler head at 37 is an uncoupling link 38 which is provided at one end with an eye or opening 39, and a hook projection 40. The link 38 is so related to the safety latch 27 that the projection 40 will engage with the abutment 41 of the safety latch as the link is moved about the pivot 37. From Fig. 3 it will be noted that as the lower end of the link 38 is moved to the left it first acts on the safety latch 27 to move it about its pivot until the notch 35 is free of the coupler body and further movement of the lower end of the uncoupling link 38 will then act upon the safety latch to raise the same and to simultaneously raise the lock 16 to its unlocking position.

When the lock has been raised to its unlocking position and the knuckle tail moved to its unlocking position, the lock will be held in the position shown in Fig. 4 and if the link 38 is now released it will drop back to the position shown in Fig. 3.

In order to operate the link 38 I pivotally mount on the car sill 10, or at a convenient place, a lever 42 and to the lower end attach a handle rod 43. Intermediate the ends I provide a connecting rod 44 which connects the lever 42 with the uncoupling link 38.

I find that occasionally there is some obstruction preventing me from using a straight lever 42 and that it is necessary for me to crook the same, and this I have shown. I also distribute the metal of the lever 42 such that its axis instead of being vertical will be inclined and the link held in the position shown in Fig. 3. The rod 44 is provided with an elongated eye at one end such that neither end of the rod forming the eye will press against the link 38 when the parts are in coupled relation, and the elongated eye will permit lateral movement of the coupler relative to the car without danger of the uncoupling mechanism being stressed to the point of unintentionally or accidentally cause uncoupling.

It will be noted from Fig. 3 that the lever 42 may be moved until its axis is substantially vertical before the lock begins to lift against the tension of the spring 30. This position of the lever 42 will give the maximum leverage for acting upon the lock to uncouple the same against the tension of the spring 30.

The heads are provided with a spring controlled knuckle opener 45.

In Fig. 11 I have shown what may take place in designing my coupler head if the conditions under which the device is constructed are such that it is not possible for the wedge lock to drop back of the knuckle tail as the heads are brought together. Under such conditions the knuckle of one or both heads will not move to the fully locked position with respect to the knuckle of the cooperating coupler. This condition I do not find exists with a coupler designed to operate with a horizontally movable wedge lock as then there is ample opportunity of so relating the parts that the wedge lock will unquestionably act upon the knuckle tail to move it to its locking position.

In order to correct this condition, I provide a spring mounted plunger 46 in one face of the knuckle tail intermediate the pivotal point and the end of the tail, and this spring mounted plunger is so located that it will engage the knuckle lock 22 of the cooperating coupler as the two move together, as shown in Fig. 13. The pressure of the knuckle of one head upon the spring mounted plunger in the knuckle of the other head is sufficient to move the tail beyond the position shown in Fig. 11 and to a point where the lock 16 will be released and free to drop back of the tail of its knuckle, and thus further force the knuckle to its full locking relation with the knuckle of the cooperating head to draw the faces 2 and 3 into engagement. The parts are so constructed and positioned relative to each other that there is clearance to permit additional movement of the wedge and knuckle beyond that necessary to bring the faces 2 and 3 into engagement in order to hold the faces in tight engagement, to take up lost motion between the heads, to compensate for wear and to prevent longitudinal movement between the heads.

In Fig. 12 two heads are shown in fully locked relation. The spring mounted plungers 46 have returned partially or wholly to their normal uncoupled position.

By changing the contour of the faces of the locking end 22 of the knuckle from that which has been and is a standard, the parts may be designed to function without the use of the spring plunger 46 or its equivalent, but this probably would not permit the intercoupling with the present day standard coupler in an emergency.

The guide slot 25 engages with the guide tongue 47 and assists in maintaining the predetermined relation and functioning of the lock 16 to its associated part.

Figs. 11 and 13 show one knuckle fully closed and the other partially open which is the usual set-up when coupling, but both knuckles may be open and a coupling effected.

The draft member 8 may form a part of a rigid or spring type draft-gear secured to the car in such manner as is well known to those skilled in the art.

While I have shown and described a combination using a vertical lock, it may be found under some conditions very inconvenient or impossible to construct a coupler using a horizontal lock and have the same automatically take on a wedging relation with the knuckle without some means of first assisting in bringing the knuckles to a sufficiently closed position, and in such case the means may include my spring held plunger 46 or its equivalent.

Having disclosed my invention, the same will suggest modifications to those skilled in the art and, therefore, I wish to be limited only by my claims.

I claim:—

1. In combination, a pair of Janney type couplers having abutting faces and knuckles for holding said faces in engagement and preventing relative longitudinal movement of the couplers, vertically operating wedge locking means associated with each knuckle tail to impart movement to the knuckle and to hold the knuckle against unlocking movement, the wedge locking means held in unlocking relation to the knuckle by the knuckle tail when the knuckle is in its unlocking position, means to move the knuckles when open only to a partial locking position by the bringing together of the couplers due to the incapability of further longitudinal movement as a result of the contacting of the abutting faces, spring held reciprocating means associated with each knuckle tail and movable with and relative thereto to engage the knuckle on the cooperating coupler to further complete the movement of the knuckle to the coupling position and to release the locking means to act upon the knuckle to complete the movement of the knuckle to the fully coupled position.

2. In combination, a coupler head having means at one end to pivotally connect it to a support, the head provided with a pivotally mounted coupling means projecting forwardly and rearwardly from the other end of the head, a constantly acting wedge locking means for moving the coupling means to and holding the coupling means in its full coupling position, the wedge locking means being so related to the coupling means that the wedge locking means is held inactive by the coupling means when the coupling means is in its uncoupled position, means on the coupling means to engage the coupling means on a cooperating head to move the coupling means to a partially coupled position without releasing the wedge locking means and other means on the coupling means to engage the coupling means on the cooperating head to assist in moving the coupling means to a position to release the wedge locking means as the two heads move into coupling relation and means to limit the unintentional movement of the locking means in a direction to release the coupling means while the coupling means is in the coupling position.

3. In combination, a pair of Janney type couplers having coupling knuckles and locking means to hold the knuckles in locked position and co-operating means to align the heads in coupling, each head having a face engaging that on the companion coupler, each knuckle being so related to its locking means that the locking means is held in an unlocked position by the knuckle until the knuckle has been moved to a position short of its fully coupled position, each knuckle co-operating with the knuckle and head of the counterpart coupler to move the knuckle only to a position short of its fully coupled relation due to the incapability of further longitudinal movement of the couplers as a result of the contacting of the said faces and reciprocating yielding means associated with each coupler tail to co-operate with the knuckle on the counterpart coupler to move the knuckles to a further coupled position to release the locking means to move the knuckles to their fully locked positions.

4. In combination, a pair of Janney type couplers having heads and coupling knuckles and abutting faces, locking means to move the knuckles to and hold them in a fully locked position, each knuckle being so related to its locking means that the locking means may be held in an unlocked position, means on each head cooperating with the knuckle on the counterpart head to move the knuckles from an open to a partially closed position due to the faces engaging before the knuckles are completely closed, means on each knuckle and yieldable relative thereto to engage the cooperating knuckle to assist the last said means to further move each of the knuckles to a position to release the locking means and permit them to function as aforesaid.

5. In combination, a coupler head, the head provided with a pivotally mounted coupling means projecting forwardly and rearwardly from one end of the head, a constantly acting locking and wedging means for moving the coupling means to and holding the coupling means in its full coupling position, the locking and wedging means being so related to the coupling means that the locking and wedging means is held inactive by the coupling means when the coupling means is in its uncoupled position, means to move the coupling means from its open position to a partially closed position due to the incapability of further longitudinal movement when coupling with a counterpart head as a result of engaging parts on the head limiting further movement thereof and yielding means on the coupling means arranged to cooperate with the coupling means on the counterpart head to move the coupling means to a position to release the locking and wedging means.

6. In a car coupler, the combination of a coupler body having an angularly disposed locking face and an abutment to engage the abutment on a cooperating coupler, a knuckle pivoted to said head and having a lock engaging face, a spring actuated wedge lock having locking faces to correspond with the locking faces engaged thereby to move the knuckle to its locking position and exert a continuous force thereon to further move the knuckle and bring the abutments together, means for lifting the lock to its unlocking position to rest upon the knuckle, means to move the knuckle from its open position only to a partially closed position due to the longitudinal movement of the coupler moving in a coupling direction being checked by engagement of the abutments and other means associated with the coupler to cooperate with the knuckle on the cooperating coupler to exert a force on the first mentioned knuckle sufficient to further move the knuckle and effect a release of the lock upon the knuckle.

7. In combination, a pair of Janney type couplers having abutting faces and knuckles for holding the said faces in engagement and preventing relative longitudinal movement of the couplers, wedge locking means associated with each knuckle tail to impart movement to the knuckle and to hold the knuckle in locked position, the wedge locking means being held in its unlocked position by the knuckle tail when the knuckle is in its unlocked position, means to move the knuckles when open only to a partially locked position by the bringing together of the couplers due to the incapability of further longitudinal movement as a result of the engagement of the abutting faces, means associated with each knuckle tail to engage the knuckle on the cooperating coupler to further complete the movement of the knuckle to the coupled position prior to the contacting of the faces to release the locking means to permit it to act upon its knuckle to complete the movement of the knuckle to the fully coupled position.

8. In combination, a pair of Janney type couplers having abutting faces and knuckles for holding the said faces in engagement and preventing relative longitudinal movement of the couplers, wedge locking means associated with each knuckle tail to impart movement to the knuckle and to hold the knuckle in locked position, the wedge locking means being held in its unlocked position by the knuckle tail when the knuckle is in its unlocked position, means to move the knuckles when open only to a partially locked position by the bringing together of the couplers due to the incapability of further longitudinal movement as a result of the engagement of the abutting faces, yielding means associated with each knuckle tail and movable relative to the knuckle to engage the knuckle on the cooperating coupler to further complete the movement of the knuckle to the coupled position prior to the contacting of the faces to release the locking means to permit it to act upon its knuckle to complete the movement of the knuckle to the fully coupled position.

ERNST A. LARSSON.